United States Patent
Okimoto et al.

(10) Patent No.: US 7,305,555 B2
(45) Date of Patent: Dec. 4, 2007

(54) SMART CARD MATING PROTOCOL

(75) Inventors: John I. Okimoto, San Diego, CA (US);
Eric J. Sprunk, Carlsbad, CA (US);
Lawrence W. Tang, San Diego, CA
(US); Annie On-yee Chen, Del Mar,
CA (US); Bridget Kimball, Encinitas,
CA (US); Douglas Petty, San Diego,
CA (US)

(73) Assignee: General Instrument Corporation, Horsham, PA (US)

( * ) Notice: Subject to any disclaimer, the term of this patent is extended or adjusted under 35 U.S.C. 154(b) by 951 days.

(21) Appl. No.: 10/109,111

(22) Filed: Mar. 27, 2002

(65) Prior Publication Data

US 2003/0188164 A1   Oct. 2, 2003

(51) Int. Cl.
| | |
|---|---|
| *H04L 9/00* | (2006.01) |
| *H04K 1/00* | (2006.01) |
| *G06F 11/30* | (2006.01) |
| *G06F 12/14* | (2006.01) |
| *G06Q 40/00* | (2006.01) |
| *H04L 9/32* | (2006.01) |
| *H04N 7/167* | (2006.01) |
| *H04N 1/44* | (2006.01) |
| *H04K 1/02* | (2006.01) |

(52) U.S. Cl. ............... 713/168; 713/177; 713/181; 713/170; 713/189; 713/165; 713/176; 713/169; 705/51; 705/52; 705/53; 705/54; 705/55; 705/56; 705/57; 380/232; 380/278; 380/281

(58) Field of Classification Search ........ 380/201–284; 713/171–201, 165, 168–170; 705/51–57
See application file for complete search history.

(56) References Cited

U.S. PATENT DOCUMENTS 5,604,801 A * 2/1997 Dolan et al. ............... 713/159

(Continued)

FOREIGN PATENT DOCUMENTS

EP    0471373 A2    2/1992

(Continued)

OTHER PUBLICATIONS

Schneier, "Applied Cryptography Second Edition: protocols, algorithms, and source code in C", Applied Cryptography, John Wiley & Sons, New York, pp. 30-31, 180-181, 265-301, 351-354, 429-459, XP002104180.

(Continued)

*Primary Examiner*—Ayaz Sheikh
*Assistant Examiner*—Shin-Hon Chen
(74) *Attorney, Agent, or Firm*—Larry T. Cullen

(57) ABSTRACT

A system is described for uniquely mating components of a communication network such as a smartcard and a set-top box. When mated, the smartcard and set-top box are tied together and have a single identity. Further, the smartcard operates properly only when inserted into an authorized set-top box. Exchanges of information between both components are secured by encryption and authentication to guard against piracy of the exchanged information. The system provides the same authentication key to the set-top box and the smartcard. This key is used for authenticating communication between the set-top box and the smartcard. First, the authentication key is encrypted by a set-top box mating key. The set-top box employs this mating key to decrypt the authentication key. After it is derived, the authentication key is stored in the set-top box's memory. Further, the same authentication key is encrypted by a smartcard mating key. Thereafter, the smartcard employs the smartcard mating key to extract the authentication key. The clear authentication key is stored in the smartcard's memory as well. In this manner, the authentication key is used for securing all communication between the set-top box and the smart-card. For example, the set-top box may request control words from the smartcard. Only after authenticating the request, are the control words for decrypting digital content provided to the set-top box. If the smartcard authentication key is different from the set-top box key, the request for control words is denied.

17 Claims, 6 Drawing Sheets

U.S. PATENT DOCUMENTS

| | | | | |
|---|---|---|---|---|
| 6,157,719 A | * | 12/2000 | Wasilewski et al. | 380/210 |
| 6,363,149 B1 | * | 3/2002 | Candelore | 380/45 |
| 6,466,671 B1 | * | 10/2002 | Maillard et al. | 380/227 |
| 6,853,728 B1 | * | 2/2005 | Kahn et al. | 380/239 |
| 2001/0009026 A1 | * | 7/2001 | Terao et al. | 713/170 |

FOREIGN PATENT DOCUMENTS

| | | |
|---|---|---|
| EP | 1026898 A1 | 8/2000 |
| WO | WO 97/38530 A1 | 10/1997 |

OTHER PUBLICATIONS

Schneier, "Applied Cryptography Second Edition: protocols, algorithms, and source code in C", Applied Cryptography, John Wiley & Sons, New York, publication date: 1996, pp. 30-31, 180-181, 265-301, 351-354, 429-459, XP002104180.

* cited by examiner

SMART CARD MATING PROTOCOL

BACKGROUND OF THE INVENTION

The present invention generally relates to communication systems, and more specifically to a protocol for mating a signal receiver to a device that enables access to such content as in MPEG-2 streams.

Typically, delivery of MPEG-2 streams functions as follows: first, customer set-top boxes STBs which receive the MPEG-2 stream are assigned unique identities and are authorized for particular services or content through the use of individual Entitlement Management Messages (EMMs). EMMs are control messages that convey access privileges to subscriber terminals. Unlike ECMs (Entitlement Control Messages)(discussed below) which are embedded in transport multiplexes and are broadcast to multiple subscribers, EMMs are sent unicast-addressed to each subscriber terminal. That is, an EMM is specific to a particular subscriber. In a typical implementation, an EMM contains information about a key, as well as information that allows a subscriber terminal to access an ECM which is sent later. EMMs also define the tiers for each subscriber. With reference to cable services, for example, a first EMM may allow access to HBO™, ESPN™ and CNN™. A second EMM may allow access to ESPN™, TNN™ and BET™, etc. The EMMs are generally protected such that tampering is not possible, as they enable services for which the customer has paid the provider.

Digital content is often encrypted using a series of keys, or Control Words (CWs). The content is then delivered to STBs over the transport stream, along with Entitlement Control Messages (ECMs), delivering the CWs in a protected (encrypted) fashion. In a conditional access system, each content stream is associated with a stream of ECMs that serve two basic functions: (1) to specify the access requirements for the associated content stream (i.e., what privileges are required for access to particular programs); and (2) to convey the information needed by subscriber terminals to compute the cryptographic key(s) which are needed for content decryption. ECMs are typically transmitted in-band alongside their associated content streams. Typically, ECMs are cryptographically protected by a key which changes periodically. The key is typically distributed by EMMs prior to the ECMs, as noted above.

Upon receiving an MPEG-2 stream, the STB then validates that the STB is authorized by its EMM to access the delivered content; if authorization is validated, the ECMs are used to extract the CWs and decrypt the content. If not authorized, the STBs not allowed access to the content.

When smartcards are incorporated into such an arrangement, the unique identity is typically assigned to the smartcard, rather than the STB. The STB may also have its own identity, but this is not necessarily related to conditional access. The operation of this smartcard-inclusive conditional access arrangement is basically the same as described above, except that the STB asks the smartcard to handle EMMs, ECMs, and extraction of the CWs. The smartcard extracts the CWs and returns them to the STB for use in decrypting the content. The STB itself extracts the EMMs, ECMs, and other appropriate messages for the smartcard as well as perform the actual decryption using the CWs returned by the smartcard. The smartcard interface typically is not fast enough to perform the actual decryption of content; hence, the STB performs this task.

For best security, a smartcard, such as the MediaCipher™ smartcard produced by Motorola, Inc., is mated to its host STB in a secure fashion, such that the authorized (mated) smartcard will operate properly only when inserted into the authorized host STB. Exchanges of information between the host STB and the smartcard are protected (encrypted and/or authenticated), to guard against extraction and piracy of the exchanged information. Additionally, mating helps guard against the "mobile" smartcard scenario in which, for example, a customer authorizes the smartcard in his home, and then carries it to a local bar to enable authorization for public viewing of an event—generally undesirable for MSOs (multiple system operators).

In such an arrangement, the smartcard should mate uniquely to one host STB, and the smartcard should not operate when inserted into any host STB other than its mate. Further, exchanges of information between the host STB and the smartcard should be protected so that the interface is not vulnerable to non-intrusive snooping (i.e., monitoring the interface and observing the flows of information).

BRIEF SUMMARY OF THE INVENTION

A system is provided for uniquely mating components of a communication network such as a smartcard and a set-top box. When mated, the smartcard and set-top box are tied together and have a single identity. Further, all communication between both components are secured by encryption and authentication to prevent piracy of the exchanged information.

According to a first aspect of the invention, the system provides the same authentication key to the set-top box and the smartcard. This authentication key is used for authenticating all communication between the set-top box and the smartcard. Initially, the authentication key is encrypted by a set-top box mating key. The set-top box employs this mating key to decrypt the authentication key. After it is derived, the authentication key is stored in the set-top box's memory. Further, the same authentication key is encrypted by a smartcard mating key. Thereafter, the smartcard employs the smartcard mating key to extract the authentication key.

Note that the clear authentication key is stored in the smartcard's memory as well. In this manner, the authentication key is used for securing all communication between the set-top box and the smart-card. For example, the set-top box may request control words from the smartcard. Only after the request is authenticated, are the control words for decrypting digital content provided to the set-top box. If the smartcard authentication key is different from the set-top box key, the request for control words is denied. Also, the authentication key may be used for encryption.

According to another aspect of the present invention, a hashed authentication key is used for authenticating information exchanges between the smartcard and the set-top box. The hashed authentication key is computed using a protocol nonce that is provided to both the smartcard and the set-top box.

According to another aspect of the invention, a set-top provisioning key is provided. This key is used by the smartcard for encrypting the set-top mating key. Thereafter, the encrypted set-top mating key is forwarded to the set-top box. The set-top box then employs the provisioning key to extract the set-top mating key. In turn, the set-top mating key is employed for extracting the authentication key. Note that the provisioning key is symmetrical, and may be randomly generated by the set-top box. After generation, the provisioning key is securely transmitted to the smartcard. This eliminates the need for entering a key or secret code into the memory of the set-top box. Advantageously, all key exchange during the mating process is protected by encryption and/or authentication.

According to another aspect of the present invention, the set-top mating key is encrypted before transmission to the smartcard. Specifically, the set-top mating key is encrypted with the smartcard's mating key. In this manner, the set-top mating key is securely delivered to the smartcard. Typically, the smartcard mating key is stored in the smartcard's memory during manufacture. The smartcard employs this smartcard mating key to extract the set-top mating key. After extraction, the set-top mating key is returned to the set-top box. To secure its return, the set-top mating key is encrypted with the set-top provisioning key. Since the set-top box has the provisioning key, it derives the clear set-top mating key using the provisioning key. With the clear set-top mating key, the authentication key is extracted by the set-top box.

According to another aspect of the present invention, a method is disclosed for securely providing the same authentication key to a signal-receiving apparatus as well as to a token communicably coupled to the signal-receiving apparatus. The method includes the step of receiving a mating EMM from a conditional access system (CAS). In particular, the mating EMM is received by the signal-receiving apparatus. This mating EMM contains a number of messages. A first message contains the authentication key encrypted by set-top mating key. A second message contains the authentication key encrypted by a smartcard mating key. In a third message, the set-top mating key is encrypted by the smartcard mating key. The second and third messages are thereafter sent to the token.

Further, the method includes the step of using the token to derive the set-top mating key from the third message. The smartcard mating key stored in the smartcard memory is employed for deriving the set-top mating key. Moreover, the smartcard mating key is employed for deriving the authentication key from the second message as well. Further, the method includes the step of using the signal-receiving apparatus to derive the authentication key from the first message, the authentication key being derived with the set-top mating key previously derived by the token.

By employing a conditional access system and cryptographic keys, the method restricts authorized smartcards to authorized hosts. Without delivery of the mating EMM by the conditional access system, there can be no mating.

A further understanding of the nature and advantages of the present invention herein may be realized by reference to the remaining portions of the specification and the attached drawings. References to "steps" of the present invention should not be construed as limited to "step plus function" means, and is not intended to refer to a specific order for implementing the invention. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

The initial in-home mating process employing principles of the present invention commences when a customer inserts a smartcard into a host STB (set top box) for the first time and contacts the MSO (multiple systems operator) to enable services. In such case, the host STB is assumed not to have any stored information about the smartcard, previous to smartcard insertion.

Figure 1:
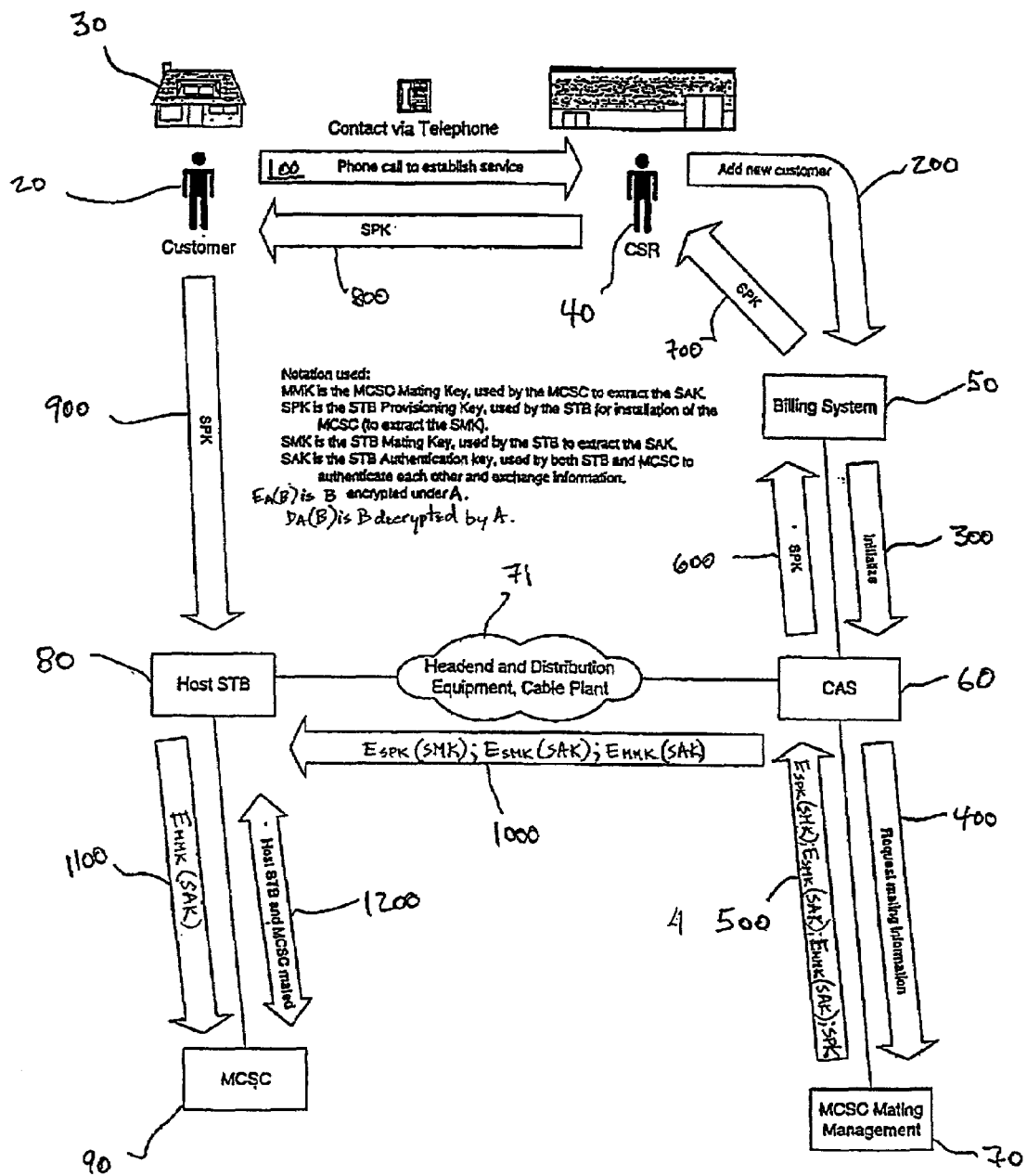
FIG. 1 is a high-level schematic flow diagram illustrating initial smartcard-STB mating according to principles of the present invention.

FIG. 1 is a high-level schematic flow diagram illustrating initial smartcard-STB mating according to principles of the present invention.

The commencement of the illustrated mating process is premised on a customer 20 having obtained and installed the host STB 80 in a viewing locale 30 such as a residence or place of business. The customer has obtained a smartcard from an MSO via postal mail, retail distribution, or other delivery means known in the art. Each such smartcard is identified by a unit address and carries a smartcard mating key (MMK) that is preferably associated with the smartcard at the time of smartcard manufacture. The MMK is stored and managed internally by the manufacturer. The customer inserts the smartcard into the host STB 80, thereby prompting the STB to detect and prepare for communication with the smartcard. The host STB 80 queries the smartcard for the identity of the smartcard. The smartcard replies with its unit address, and potentially with multicast addresses as well.

As such, the identity of the smartcard has been established to the host STB prior to performance of step 100, so that the host STB may, at the appropriate time, identify and retrieve messages (EMMs, ECMs) intended for the smartcard inserted therein. At step 100, customer 20 contacts a customer service representative (CSR) 40 of the MSO and requests service in association with the smartcard. Customer 20 contacts CSR 40 by a telephonic, online or other appropriate communication type known in the art.

At step 200, CSR 40 enters into the billing system 50 of the MSO appropriate application information pertaining to customer 20. Billing system 50 interfaces with both CSR 40 and CAS 60 (discussed below) to provide the following functions: (1) accepting subscription and service change requests from subscribers; (2) maintaining subscriber account information; (3) billing subscribers; (4) interfacing with conditional access system 60 to provide the CAS with subscriber authorization status and to collect customer purchase information; and (5) providing subscriber authorization status, service and event definition information, and collecting purchase information. Note that billing system may have a different configuration since the present invention may employed in systems such as call-ahead VOD (video on demand), IPPV (instant pay per view), etc.

In response to receipt of this application information, at step 300 billing system 50 initializes the smartcard/host STB arrangement of customer 20 on CAS 60 of the MSO. CAS 60 permits access to encrypted content by subscriber terminals by provisioning them with EMMs, and generating ECMs. Other functions of CAS 60 include controlling real-time encryption devices in the cable system; reporting the (scheduled) occurrence of key changes to the encryption renewal system, and transmitting cable system-specific cryptographic parameters (e.g., keys) to an encryption renewal system to enable ECM retrofitting. CAS 60 may be located either on site or off site, and may serve multiple cable systems, in which case CAS 60 acts as multiple logical conditional access systems. Furthermore, CAS 60 interfaces with billing system 50 to obtain authorization information about each subscriber, and to report purchases to the billing system. CAS systems are well known in the art and may comprise off the shelf items. In addition, one of ordinary skill in the art, such as a programmer, can develop code as may be necessary to accommodate the present invention.

At step 400, CAS 60 requests smartcard mating information (described below in further detail) from a smartcard mating management system 70 of the MSO. The mating management system is part of the conditional access system, but includes custom software and hardware to support new smartcard Media Cipher Smartcard (MCSC) mating functionality. Mating management system 70 performs smartcard mating management functions, including generation and management of secure keys and messages to administer the mating process. Preferably, management system 70 is physically secured and separated from other access controller functions to prevent piracy/theft of its algorithms and keys. That is, secure algorithms and keys are in an ASIC chip physically separated from nonsecure processing.

Management system 70 accepts identified smartcard and host STB pairs to be initially mated, and generates keys and messages to complete the initial mating process. Specifically, system 70 generates the STB Provisioning Key ("SPK"), the STB Mating Key ("SMK"), or "$E_{SPK}(SMK)$" which is the SMK encrypted under the SPK, and STB Authentication Keys ("SAK"). The SAKs may be either encrypted under the SMK—in which case, such SAK is denoted "$E_{SMK}(SAK)$" herein—or the MMK—(in which case, such SAK is denoted "$E_{MMK}(SAK)$" herein. System 70 generates EMMs (for each such key except the SPK) that enable secure transmission of these keys to the smartcard/host STB. System 70 stores and tracks the entirety of this generated information.

Management system 70 further accepts identified smartcard and host STB pairs to be re-mated (discussed below in further detail), indexed by the smartcard initially mated to the host STB. Because the host STB does not have its own innate identity, smartcards subsequent to the initially mated smartcard may be mated to the host STB by identifying the initially mated smartcard, transferring the configuration of the initially mated smartcard to a subsequent smartcard, and mating the subsequent smartcard to the original host STB. Preferably, management system 70 is responsible only for SPK, SMK, and SAK information; conditional access system 60 is responsible for entitlements (including transferring entitlements between initially mated and subsequent smartcards). Management system 70 accepts queries and re-generation of SAKs and EMMs for general administrative purposes.

At step 500, management system 70 returns smartcard mating information (i.e., SPK, $E_{SPK}(SMK)$, $E_{SMK}(SAK)$ and $E_{MMK}(SAK)$) to the conditional access system 60 actually contained in the EMMs, except SPK. It is important to note that the simultaneously transmitted SAK, although encrypted under different keys, $E_{SMK}(SAK)$ and $E_{MMK}(SAK)$, are identical.

At step 600, CAS 60 forwards the SPK generated by management system 70 to billing system 50 in response to the initialization by billing system 50 performed in step 300. The SPK is the means by which each host STB is provided its unique identity.

At step 700, billing system 50 returns the SPK to CSR 40 in response to the initial request made by CSR 40.

At step 800, CSR 40 communicates the SPK to customer 20. Because cable path 71 carries security risks, personalization of the host STB is done outside of cable path 71 (i.e., not via the cable into the host STB). Accordingly, CSR 40 gives the customer the SPK information, which consists of a code to be typed into the host STB via its front panel or remote control, to personalize the host STB. Preferably, the SPK is provided to the customer by the CSR in a human-readable form, such as a code word or a limited amount of numerical data.

At step 900, customer 20 enters the SPK into the host STB 80 via its front panel, by remote control, or by other appropriate means known in the art. Entry of the SPK into the host STB serves to personalize host STB 80 to customer 20. Once the SPK is so entered, host STB 80 is expected to retain the entered SPK indefinitely. The only time re-entry may be required for a specific host STB is when the host STB is damaged in some way (e.g., memory corrupted) or there is some operational problem requiring full re-initialization (in which case a different SPK is entered.)

At step 1000, CAS 60 forwards the remainder of the smartcard mating information (i.e., the $E_{SPK}(SMK)$, $E_{SMK}(SAK)$ and $E_{MMK}(SAK)$) embedded in EMMs to host STB 80 via the cable headend distribution equipment and the cable plant 71. Preferably, this mating information is delivered in an encrypted form. Host STB 80 has adopted the smartcard unit address, thereby enabling the host STB to receive the EMMs, extract the mating information intended for the host STB, and then pass the EMMs to the smartcard for further processing. Preferably, the encrypted values $E_{SPK}(SMK)$ and $E_{SMK}(SAK)$ are retained by the host STB indefinitely.

At step 1100, host STB 80 forwards the $E_{MMK}(SAK)$ to smartcard 90. The smartcard acknowledges receipt of the $E_{MMK}(SAK)$ via a reply signal to STB 80. If the smartcard is not present (i.e., has been removed from the host STB, has not been received by the customer, etc.), the $E_{MMK}(SAK)$ is discarded and may be re-sent by CAS 60 with $E_{SMK}(SAK)$ at a later time.

According to principles of the present invention, the host STB makes continual requests to smartcard 90 for a control signal, such as a control word, in order to decrypt authorized content. The control signal requested by STB 80 could also comprise a certificate or any other appropriate cryptographic service known in the art. All such requests are authenticated, so that only the host STB mated to and authorized for a particular smartcard may make requests that such smartcard will grant.

As such, at step 1200, mating is completed upon successful completion of any authenticated request. This process in its preferred form is shown in greater detail in FIG. 2, where, at step 2000, smartcard 90 employs its MMK in order to decrypt the $E_{MMK}(SAK)$. At step 2010, STB 80 employs the SPK in order to decrypt the $E_{SPK}(SMK)$. At step 2020, STB 80 employs the SMK in order to decrypt the $E_{SMK}(SAK)$. At step 2030, host STB 80 sends to smartcard 90 a request for a control signal, such as a control word. This request includes an authenticator using the SAK (the SAK retained and decrypted by host STB 80).

At step 2040, smartcard 90 verifies the request. In a first aspect, the request is verified by using the SAK with the data to be authenticated and a hash function to yield an authenticator delivered as part of the communication. The host STB 80 generates an authenticator and sends it to smartcard 90 which duplicates the computation with its own SAK. If the authenticator matches, authentication passes and at step 2050 smartcard 90 responds to host STB 80 with a positive reply (i.e., a reply containing the CW encrypted by the same SAK). Host STB 80 may then decrypt the control word using its SAK; mating is complete and the customer has services (e.g., subscription television, etc.). If the host STB and smartcard do not have matching SAKs, at step 2060 smartcard 90 negatively responds that authentication, and thus mating, is not possible.

An alternative mating situation employing principles of the present invention is a re-mating scenario. In such case, the customer has performed the initial mating process described above and may mate a new smartcard to the customer's existing STB. This could be due to an upgrade to the smartcard's capabilities, or perhaps as a security precaution.

Figure 3:
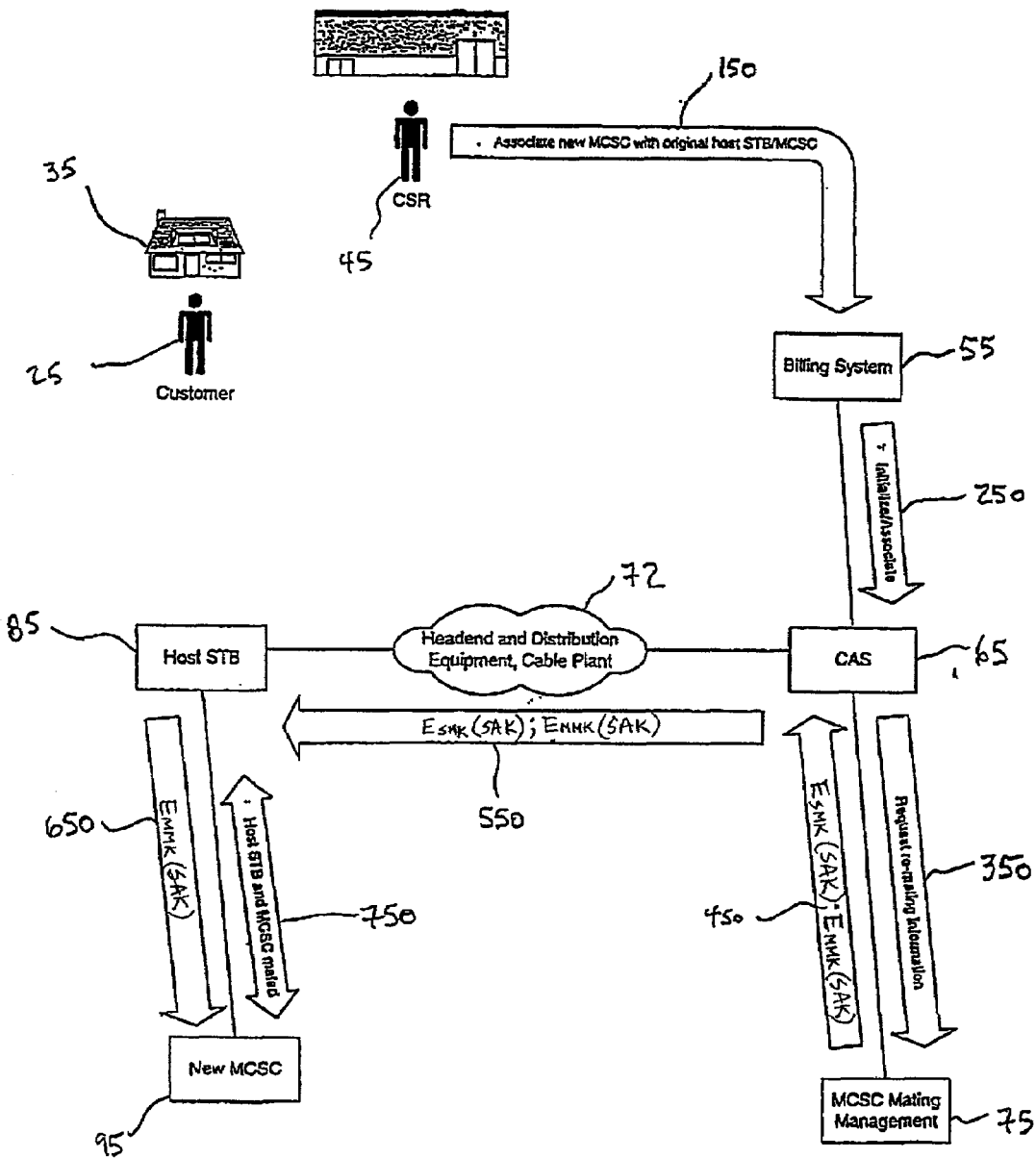
FIG. 3 is a high-level flow diagram illustrating smartcard/STB re-mating according to principles of the present invention.

FIG. 3 is a high-level flow diagram illustrating smartcard/STB re-mating according to principles of the present invention.

The commencement of the illustrated re-mating process is premised on a new smartcard having been delivered to a customer 25 such that customer 25 may remove the old smartcard from the STB and insert the new smartcard.

At step 150, the CSR 45 requests association of a new smartcard to a specific customer 25 via the billing system 55 of the MSO.

At step 250, billing system 55 initializes the new smartcard/host STB mating pair on the CAS 65 of the MSO, using identifying information pertaining to the old smartcard as an index to locate the customer's current host STB.

At step 350, CAS 65 requests new smartcard mating information from a smartcard mating management system 75 of the MSO. Mating management system 75 is identical in function and capability to that of mating management system 70 described above. Typically, the same smartcard mating management system is employed, so it would have necessary information from the original mating.

At step 450, the smartcard mating management system 75 returns the new smartcard mating information (i.e., $E_{SMK}(SAK)$ and $E_{MMK}(SAK)$) to CAS 65. Note that the new SAK is different than SAK from original mating.

At step 550, CAS 65 forwards the $E_{SMK}(SAK)$ and $E_{MMK}(SAK)$ embedded in EMMs to host STB 85 via the cable headend distribution equipment and the cable plant 72. Preferably, this mating information is delivered in an encrypted form. The encrypted value $E_{SMK}(SAK)$ is retained by the host STB 85 indefinitely.

In comparison, step 1000 of FIG. 1 sends $E_{SPK}(SMK)$ whereas step 550 of FIG. 3 does not. The difference is that for re-mating, host STB already has the SMK, so there's no need to send it again. The following are several options for delivering new mating information to the new smartcard.

(1) CAS 65 could pre-initialize the smartcard with the new mating information and entitlements before delivery of the smartcard to STB 85.

(2) CAS 65 could send the new mating information and entitlements in care of the old smartcard, and the host STB 85 could store them until the new smartcard arrives—this means overhead and memory within the host STB.

(3) The smartcard could trigger sending of the new mating information and entitlements via the return path (RF, modem, etc.) This presumes the return path is present, which may or may not be true. This solution requires automatic autonomous report from the host STB to CAS 65.

(4) The customer could call the MSO. This solution reasonable for all situations where a return path is not present.

(5) The mating information and entitlements could be rebroadcast over the system repeatedly until it is likely that the customer has received the messages. It should be noted that mating relies on knowing smartcard is inserted, since the user enters the SPK and is on the phone, while re-mating and does not know when smartcard is inserted. No phone call is placed.

At step 650, the host STB 85 forwards the $E_{MMK}(SAK)$ to the smartcard 95. The smartcard acknowledges receipt of the $E_{MMK}(SAK)$. If the smartcard is not present (i.e., has been removed from the host STB, has not been received by the customer, etc.), the $E_{MMK}(SAK)$ and $E_{SMK}(SAK)$ is discarded and may be re-sent by CAS 65 at a later time.

According to principles of the present invention, the host STB 85 makes continual requests to smartcard 95 for a control signal, such as a control word, in order to decrypt authorized content. The control signal requested by STB 85 could also comprise a certificate or any other appropriate cryptographic service known in the art. All such requests are authenticated, so that only the host STB mated and authorized for a particular smartcard may make requests that such smartcard will grant.

As such, at step 750, smartcard 95 employs its MMK in order to decrypt the $E_{MMK}(SAK)$. STB 85 employs the SPK in order to decrypt the $E_{SPK}(SMK)$. Then STB 85 employs the SMK in order to decrypt the $E_{SMK}(SAK)$.

Re-mating is completed upon successful completion of any authenticated request. For example, host STB 85 sends a request to smartcard 95. The request may be authenticated for a control word, authenticated using the SAK (the SAK retained and decrypted by host STB 85). If such SAK is successfully authenticated (as previously noted), smartcard 95 responds to host STB 85 with a positive reply (i.e., a reply containing the CW encrypted by the same SAK). Host STB 85 then decrypts the control word using its SAK, mating is complete and the customer has services (e.g., subscription television, etc.). If the host STB and smartcard do not have matching SAKs, then authentication, and thus mating, is not possible.

Figure 4:
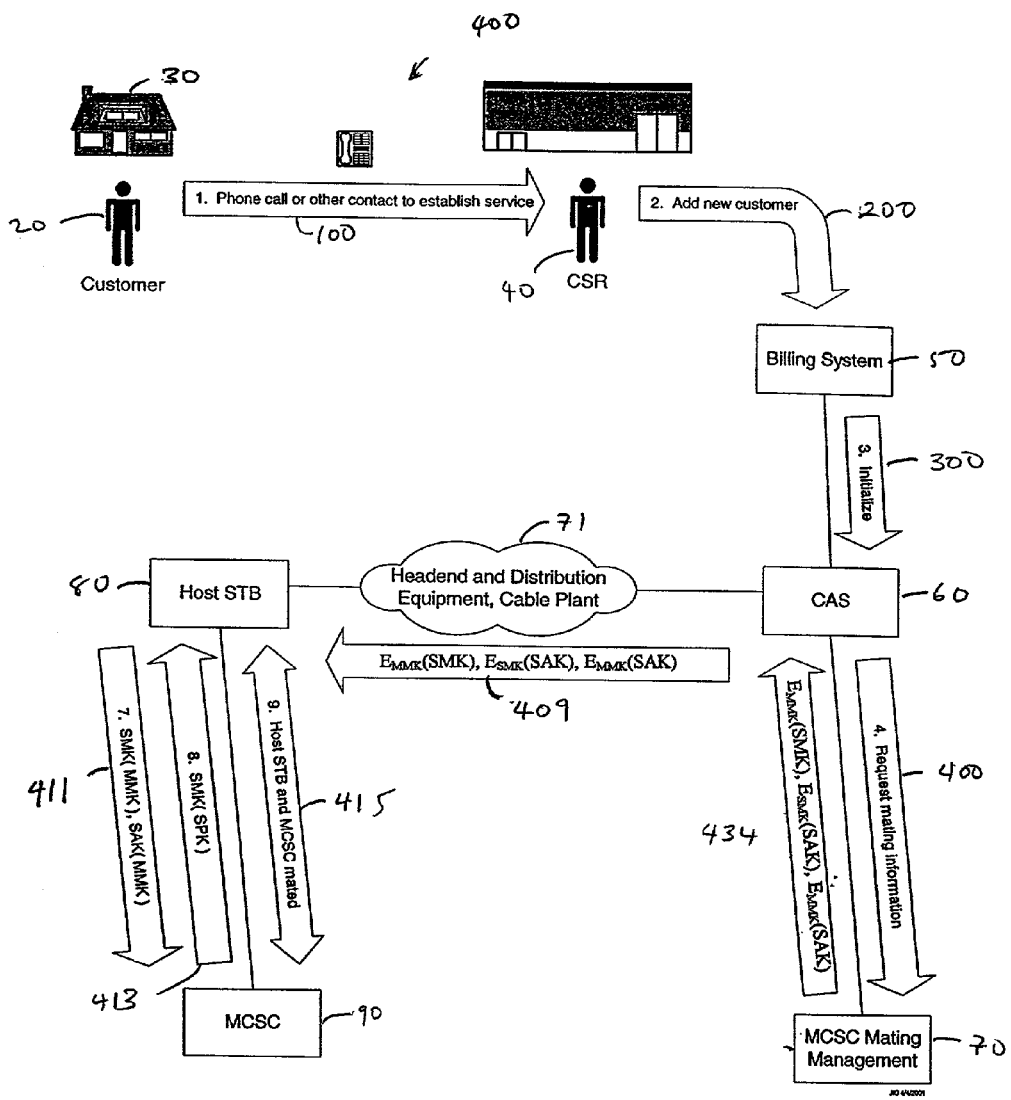
FIG. 4 is a high-level schematic flow diagram illustrating an alternate embodiment of initial smartcard-STB mating according to principles of the present invention.

FIG. 4 is a high-level schematic flow diagram illustrating an alternate embodiment of initial smartcard-STB mating according to principles of the present invention. Specifically, a user need not enter secret codes or an SPK into the set-top box memory.

In FIG. 4, steps 100, 200, 300 and 400 are similar to the corresponding steps of FIG. 1. For example, in step 400 of FIG. 1 and step 400 of FIG. 4, mating information is requested from system 70 by CAS 60.

At step 434, requested mating information is forwarded from system 70 to CAS 60. A mating EMM is typically used for sending the mating information. Such mating information includes $E_{MMK}(SAK)$, $E_{SMK}(SAK)$ and $E_{MMK}(SMK)$. The mating information may include a GPS time stamp indicating when the mating EMM was created. This time stamp prevents mating "replays" to keep the card mated to one STB at a time.

Advantageously, unlike other embodiments, the mating EMM does not contain an SPK. The SPK is provided later in the process. In this manner, snooping of SPKs by pirates is prevented since such keys are not transmitted from CAS 60 to set-top boxes.

At step 409, the mating ENM containing information is forwarded from CAS 60 through headend 71 to STB 80.

At step 411, STB 80 receives the mating EMM containing $E_{MMK}(SAK)$, $E_{SMK}(SAK)$ and $E_{MMK}(SMK)$. The received $E_{SMK}(SAK)$ is retained by STB 80 until the SMK is received from smartcard 90. The $E_{MMK}(SAK)$ and $E_{MMK}(SMK)$ are forwarded to smartcard 90. Advantageously, in contrast to the corresponding step of FIG. 1, an SPK need not be entered into STB 80 by the user. In this manner, human interaction is eliminated. A user need not remember secret codes nor risk such codes being stolen. Rather, the SPK is randomly generated by STB 80 and stored in the set-top box memory. In addition, the SPK is delivered to smartcard 90. To ensure secure delivery, the set-top box first verifies the authenticity of the smartcard (further explained later), then employs the smartcard's public key for encrypting the SPK before transmission to the smartcard. Upon receipt, smartcard 90 uses its private key to extract the SPK.

At step 413, the $E_{MMK}(SAK)$, the $E_{MMK}(SMK)$ and the encrypted SPK are received by smartcard 90. For the $E_{MMK}(SMK)$, smartcard 90 uses the M to extract the SMK. As noted, the MMK is stored in the smartcard's memory at the time of manufacture. This SMK is thereafter forwarded to STB 80. However, prior to forwarding, the SMK is encrypted with the SPK. The encrypted SMK i.e. $E_{SPK}(SMK)$ is then sent to STB 80. In this manner, every communication between STB 80 and smartcard 90 is secured.

For the $E_{MMK}(SAK)$, smartcard 90 again uses the MMK to extact the SAK. In this manner, the SAK is obtained by smartcard 90 in a secure fashion. Both STB 80 and smartcard 90 may now authenticate messages with the SAK. All such communication including exchange of control words is authenticated with the SAK. Note that the same SAK is provided to STB 80 as discussed below.

At step 415, the $E_{SPK}(SMK)$ value is received, from which the SMK is derived by STB 80. As noted, the $E_{SMK}(SAK)$ received from CAS 60 was previously retained by STB 80. At this point, STB 80 uses the SMK to derive the clear SAK from the $E_{SMK}(SAK)$. Both STB 80 and smartcard 90 are now mated upon successful completion of authenticated request. STB 80 may now receive subscription and program signaling. All information between STB 80 and smartcard 90 are authenticated by using the SAK. In a further embodiment, authentication may be implemented using a hashed SAK computed from the clear SAK and a PN (protocol nonce). In this embodiment the PN may be created by STB 80 and shared with smartcard 90 in 411.

Figure 5:
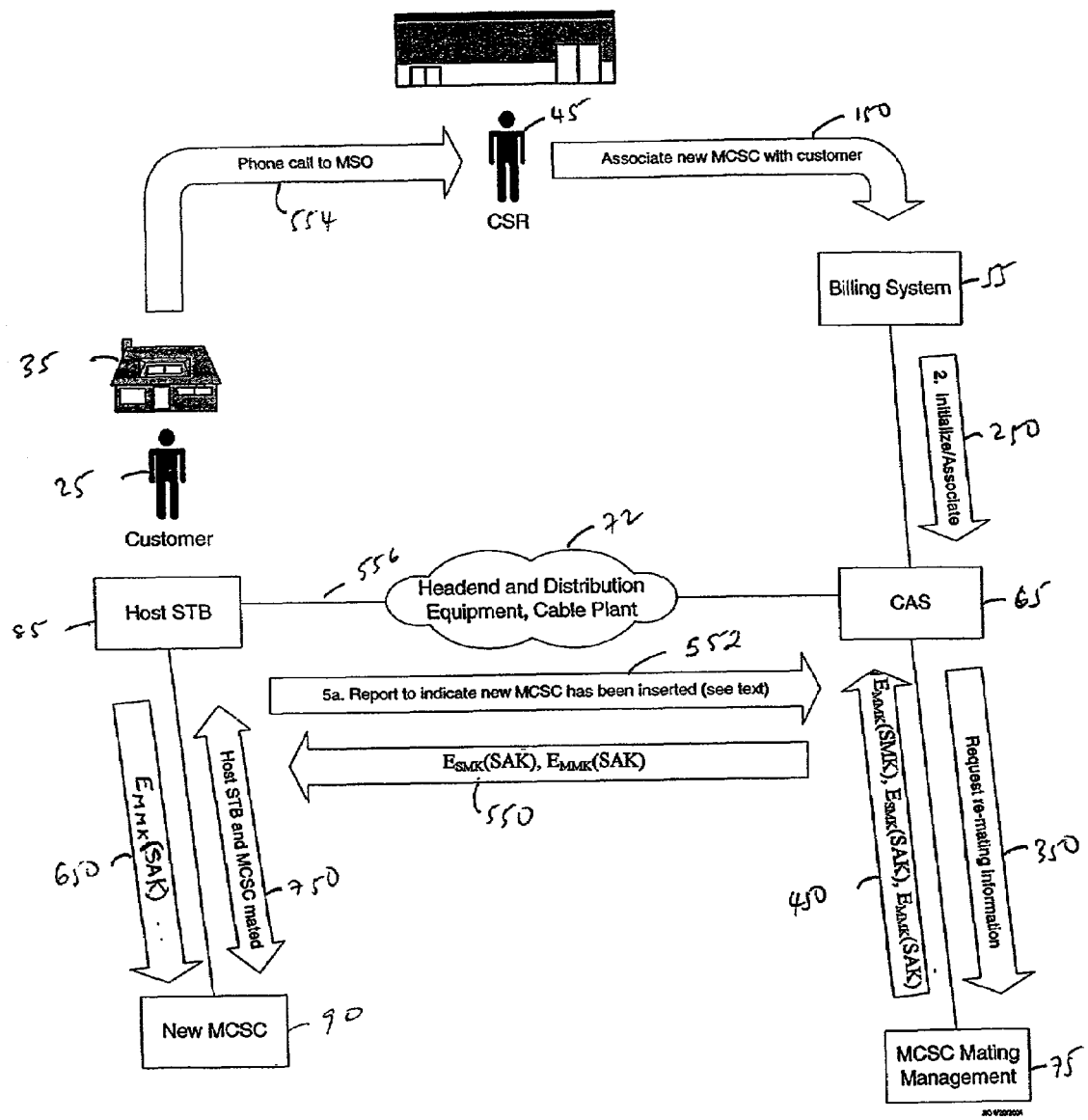
FIG. 5 is a high-level flow diagram illustrating an alternate smartcard/STB re-mating according to principles of the present invention.

FIG. 5 is a high-level flow diagram illustrating an alternate smartcard/STB re-mating according to principles of the present invention.

Figure 2:
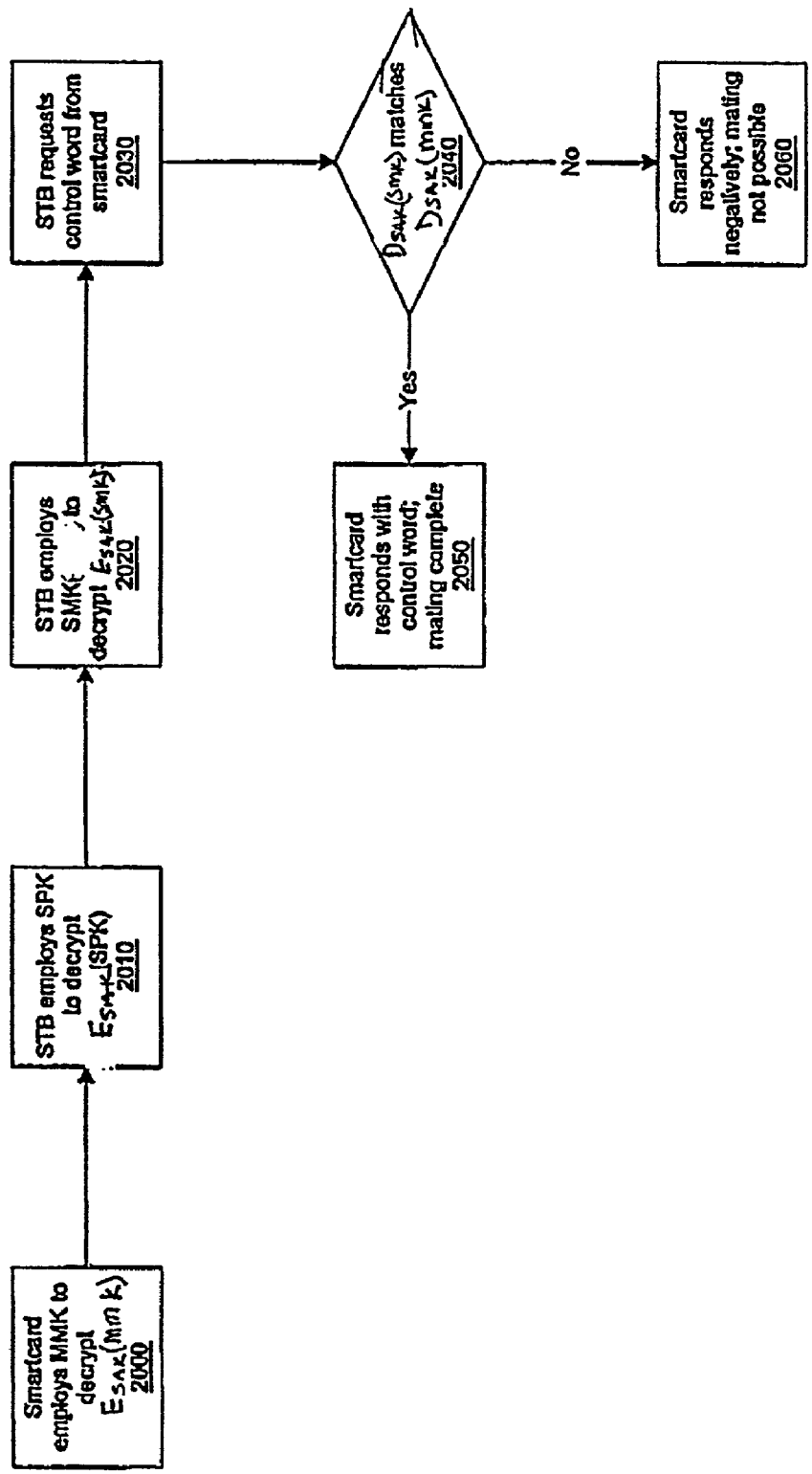
FIG. 2 is a flow diagram illustrating control signal authorization according to principles of the present invention.

In FIG. 5, many steps are similar to the corresponding steps of FIGS. 2 and 3. In addition, FIG. 5 illustrates new steps 552 and 554. After a new smartcard has been delivered and inserted by the user, CAS 65 is notified that a new smartcard has been inserted. One technique for notifying CAS 65 is via the return path provided by headend 72 as illustrated at step 552. The alternate way is shown at step 554, where the user telephonically calls the MSO. In this manner, CAS 65 is aware the new smartcard has been inserted and transfers all entitlements from the old to the new smartcard. Further, although not shown, a protocol nonce may be employed in this embodiment.

Figure 6:
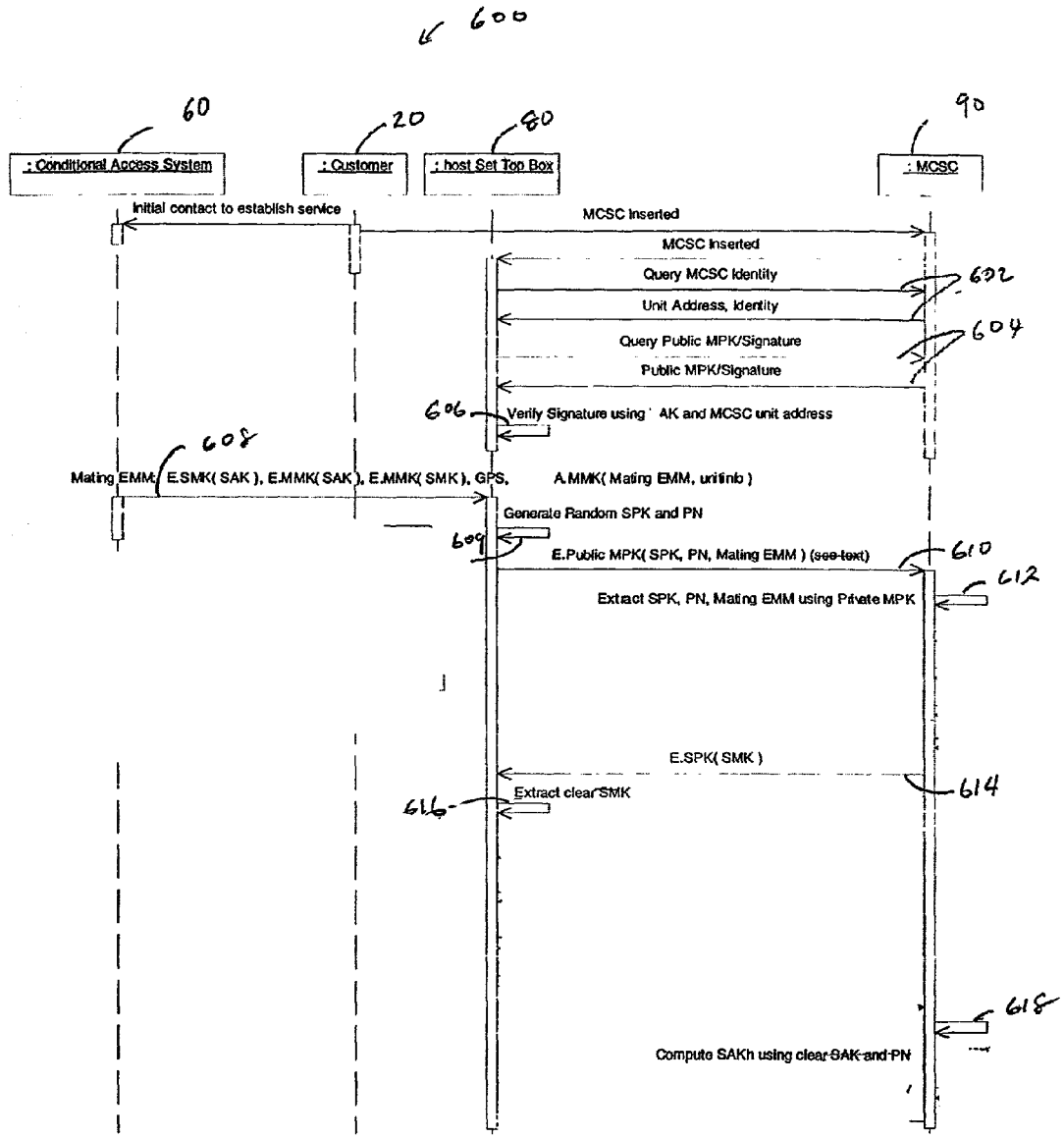
FIG. 6 is an exemplary process illustrating additional details regarding initial smartcard-STB mating in accordance with an embodiment of the present invention.

FIG. 6 is an exemplary process 600 illustrating further details regarding initial smartcard-STB mating in accordance with an embodiment of the present invention. In FIG. 6, mating details between smartcard 90 and STB 80 are shown.

At step 602, after smartcard 90 is inserted, STB 80 queries the smartcard for its identity. Responsive thereto, a unit address and identity are returned by smartcard 90. STB 80 then verifies this information.

At step 604, STB 80 queries and receives a public MPK (mating privacy key)/signature from smartcard 90. The MPK is a public/private key pair, whereas the signature is created using an authentication key and the smartcard's unit address.

At step 606, the MPK/signature is verified using the authentication key and the smartcard's unit address. If the signature is not verified, mating may not proceed. At this point, STB 80 and smartcard 90 are together and are prepared to receive messages. STB 80 configures itself with the identity of smartcard 90 and starts to receive messages.

At step 608, mating EMMs containing mating information are sent by CAS 60 to STB 80. This information is used to mate smartcard 90 and STB 80. Among other information, mating EMMs contain $E_{MMK}(SMK)$, $E_{SMK}(SAK)$, $E_{MMK}(SAK)$. Mating EMMs are sent as a result of customer 20 having contacted the MSO to establish service (in the case of initial mating, for example). Other information may include a GPS time stamp for indicating when the mating EMM was created.

At step 609, STB 80 randomly generates an SPK and a PN (protocol nonce).

At step 610, using the received public MPK, STB 80 encrypts the SPK and the PN for delivery to smartcard 90. Also, the mating EMM having other information such as $E_{MMK}(SMK)$ and $E_{MMK}(SAK)$ are encrypted with the public MPK for delivery to smartcard 90.

At step 612, using the private MPK, smartcard 90 extracts the SPK, PN, and the mating EMM having $E_{MMK}(SMK)$ and $E_{MMK}(SAK)$ if included. Thereafter, the clear SMK and the SAK are extracted using the smartcard's MMK. As noted, this key is typically stored in the smartcard's memory at manufacture time. Further, this key is used with a hash to compute a mating EMM authenticator. The authenticator ensures that no entity than the intended smartcard can process the EMM mating information. The intended smartcard accepts the mating EMM information when after proper authentication using the authenticator. Further, the GPS timestamp is validated as well. The timestamp is validated to prevent replays of old mating EMMs to keep the smartcard mated to one STB at a time.

At step 614, the extracted SMK is forwarded to STB 80. However, this key is encrypted by the SPK prior to forwarding.

At step 616, the SMK is derived by STB 80 using the SPK. At this point, the SAK is derived from $E_{SMK}(SAK)$ previously received at step 608. In accordance with the present invention, secure communication is now possible between both STB 80 and smartcard 90. By using the SAK to authenticate/encrypt all communication, security is ensured for the STB 80/smartcard 90 interface. In accordance with a further embodiment of the present invention, an SAK hash (SAKh) may be utilized for providing added security between the components. The SAKh is computed by STB 80 using the SAK and PN. Thereafter, the SAKh is stored in memory for encrypting/authenticating communication with smartcard 90.

At step 618, smartcard 90 similarly computes the SAKh using the SAK and the PN. This value is then stored in non-volatile memory. The GPS timestamp may also be stored in memory. This completes the mating process. Upon completion of the process, communication between STB 80 and smartcard 90 is protected by using the SAK or the SAKh for authentication.

Although the invention has been described in terms of the illustrative embodiment, it will be appreciated by those skilled in the art that various changes and modifications may be made to the illustrative embodiment without departing from the spirit or scope of the invention. For example, the SMK could be omitted from the above-described embodiment. In such an embodiment, the SAK would be directly encrypted under the SPK. It is intended that the scope of the invention not be limited in any way to the illustrative embodiments shown and described but that the invention be limited only by the claims appended hereto. For example, the present invention is not limited to a cable system, either but may be applicable to satellite, streaming media, etc.

What is claimed is:

1. A system for securely providing the same authentication key to components of a communication network, the system comprising:
    a) an authentication key;
    b) a first key for encrypting the authentication key;
    c) a set-top box for deriving the authentication key using the first key;
    d) a second key for encrypting the authentication key and for encrypting the first key;
    e) a smartcard for deriving the authentication key using the second key;
    f) a third key for encrypting the first key, the first key being encrypted by the smartcard, and being forwarded to the set-top box; and
    g) the set-top box receiving the encrypted first key and extracting said first key using the third key, wherein the third key is held by the set-top box and is used for deriving the authentication key wherein the authentication key uniquely mates the smartcard to the set-top box.

2. The system of claim 1 wherein the first key is extracted from the encrypted first key by the smartcard prior to f).

3. The system of claim 1 wherein the authentication key is for authenticating communication from the set-top box to the smartcard, and for encrypting communication from the smartcard to the set-top box.

4. The system of claim 1 further comprising a protocol nonce for determining a hashed authentication key using the authentication key.

5. The system of claim 4 wherein the set-top box and the smartcard both compute the hashed authentication key for storage in respective memory.

6. The system of claim 5 wherein the hashed authentication key is for authenticating communication between the smartcard and the set-top box.

7. The system of claim 6 wherein the third key is forwarded by the set-top to the smartcard.

8. The system of claim 7 wherein the third key is encrypted with the smartcard's public key.

9. The system of claim 1 wherein the second key is stored within a memory of the smartcard at the time of manufacture.

10. The system of claim 9 further comprising a conditional access system, communicably coupled to the set-top box, for transmitting the first key encrypted by the second key.

11. The system of claim 10 wherein the smartcard derives the first key by using the second key stored in the memory.

12. A method for securely providing the same authentication key to a signal-receiving apparatus as well as to a token communicably coupled to signal-receiving apparatus, the method comprising:
    a) receiving a first message comprising the authentication key encrypted by a first key;
    b) receiving a second message comprising the authentication key encrypted by a second key;
    c) receiving a third message comprising the first key encrypted by the second key;
    d) using the token to derive the first key from the third message, the first key being derived by the second key;
    e) using the token to derive the authentication key from the second message, the authentication key being derived by the second key;
    f) using a third key for encrypting the first key to form a fourth message, the first key being encrypted by the token;
    g) forwarding the fourth message to the signal-receiving apparatus;
    h) using the third key for deriving the first key, the third key being held by the signal-receiving apparatus and the first key being derived by the signal-receiving apparatus; and
    i) using the signal-receiving apparatus to derive the authentication key from the first message, the authentication key being derived with the first key wherein the authentication key uniquely mates the smartcard to the set-top box.

13. The method of claim 12 further comprising determining a hashed authentication key using a protocol nonce.

14. The method of claim 13 further comprising authenticating communication between the token and the signal-receiving apparatus, the communication being authenticated with the hashed authentication key.

15. The method of claim 12 further comprising
storing the second key in a memory of the token prior to steps d) and e).

16. The method of claim 12 further comprising
storing the authentication key in the signal-receiving apparatus; and
storing the authentication key in the token.

17. The method of claim 12, wherein the fourth message is generated by the token.

* * * * *